US006202996B1

(12) United States Patent
Cutsforth et al.

(10) Patent No.: US 6,202,996 B1
(45) Date of Patent: Mar. 20, 2001

(54) WORKPIECE CLAMPING TOOL

(75) Inventors: Robert S. Cutsforth, Anoka; Bryan A. Johnsen, Brooklyn Park, both of MN (US)

(73) Assignee: Royb, Inc., Brooklyn Park, MN (US)

( * ) Notice: Subject to any disclaimer, the term of this patent is extended or adjusted under 35 U.S.C. 154(b) by 0 days.

(21) Appl. No.: 09/352,178

(22) Filed: Jul. 12, 1999

Related U.S. Application Data

(63) Continuation-in-part of application No. 09/163,506, filed on Sep. 30, 1998.

(51) Int. Cl.[7] ...... B23Q 3/02

(52) U.S. Cl. ...... 269/137; 264/24; 269/25

(58) Field of Search ...... 269/137, 24, 25, 269/32, 134

(56) References Cited

U.S. PATENT DOCUMENTS

| | | | |
|---|---|---|---|
| 3,970,296 | 7/1976 | Rameson | 269/32 |
| 4,049,253 | 9/1977 | Mandel | 269/137 |
| 4,406,445 | 9/1983 | Seidel | 269/32 |
| 4,451,026 | 5/1984 | Coope | 269/24 |
| 4,489,927 | 12/1984 | Yamada et al. | 269/137 |
| 5,149,070 | 9/1992 | Dykstra | 269/32 |
| 5,174,554 | 12/1992 | Yonezawa | 269/24 |
| 5,244,193 | 9/1993 | Hehr | 269/99 |
| 5,324,013 | 6/1994 | Marino | 269/137 |
| 5,542,654 * | 8/1996 | Johanson | 269/137 |
| 5,690,546 | 11/1997 | Mascola | 451/365 |

OTHER PUBLICATIONS

MiTee–Bite Products Company, "Kopal Mini Clamps" Brochure, dated prior to Sep. 30, 1998.

Baoding Xiang Yang Precision Machinery, "MC Standard Fixture" Brochure, dated prior to Sep. 30, 1998.

Selected Catalog pages of Clamps, including "ADVANT–EDGE" Clamps, pp. 853, 859, 860, 896, and 899.

TRIAG Prazisionswerkzeuge, "Triage" Brochure, dated prior to Sep. 30, 1998.

* cited by examiner

*Primary Examiner*—David A. Scherbel
*Assistant Examiner*—Daniel Shanley
(74) *Attorney, Agent, or Firm*—Crompton, Seager & Tufte, LLC

(57) ABSTRACT

A workpiece clamp for holding a workpiece securely to a fixture block or work table during operations, such as machining and woodworking. The clamp includes a body and an insert, the insert having a contact face for applying force to the workpiece. The body preferably held in a cavity in the fixture block surface and the insert received in an inclined or angled recess in the body. The insert preferably includes a bore therethrough, such that a tension bolt can be inserted through the insert and into the body. Threads in the tension bolt can be engaged with threads in the body, drawing the insert along the inclined recess in the body, thereby applying tension to the tension bolt and applying downward and forward forces to the workpiece at the contact face. In one clamp, the body top is flush with or below the surface of the fixture block. In a preferred clamp, when the insert is fully inserted into the body, a small portion of the insert, including the contact face, extends above the fixture block surface. The clamp provides a strong forward and downward force on the workpiece with very little face deflection. The low profile clamp allows all but a small portion of the workpiece being held to be accessed with the tool being used, including the workpiece sides. One clamp includes flexibility imparted to the body, the insert, or both body and insert. Flexibility can be imparted by a relief cut disposed near the body upper lip or near the insert contact face.

13 Claims, 15 Drawing Sheets

WORKPIECE CLAMPING TOOL

CROSS REFERENCES TO CO-PENDING APPLICATIONS

The present application is a continuation-in-part of U.S. patent application Ser. No. 09/163,506, filed Sep. 30, 1998, entitled WORKPIECE CLAMPING TOOL.

FIELD OF THE INVENTION

The present invention is generally related to clamps suitable for use in machining and woodworking. More specifically, the present invention is related to a workpiece edge clamp capable of applying a simultaneous horizontal and downward force to a workpiece.

BACKGROUND OF THE INVENTION

Clamps are commonly used for securing workpieces to machine tables during machining operations such as drilling and milling. Edge clamps and toe clamps are frequently used. Machine operations can apply large vertical, lateral, and torquing forces on the workpiece or part being machined. The large tool forces require large counteracting clamping forces to prevent the part being machined from moving out of tolerance or flying off the machine table entirely. The clamping force requirement is exaggerated in the case of small parts being machined. In the first place, the small part typically has only a small surface area upon which a clamping force can be brought to bear. In the second place, the size of the clamping device may be of large size relative to the part being machined and can obscure tool access to a significant portion of the part, especially the part sides.

In one device, the ADVANT-EDGE™ edge clamp, a body having an inclined surface is provided along with means for securing the body to a T-slot. A nominally rectangular clamping element, having a small bore hole therethrough and a larger round surface recess, is disposed on the incline and held in place upon the incline with a bolt extending through the recess and bore hole. The bolt has a round head mounted on the end of the bolt shaft and off center from the shaft. This mounting provides a small distance from shaft center to head outside edge on one side, and a large distance from shaft center to head outside edge on the opposite side. As the head is rotated, the bolt is drawn in at an angle perpendicular to the incline, and the wider portion of the head rotates as a cam down the incline, and toward the workpiece being held. The clamping element is forced slightly downward and toward the workpiece. There are several drawbacks with this design. First, to allow the bolt to rotate, the clamping element must be spaced above the incline surface with a gap therebetween to allow the bolt to turn, otherwise the bolt would be bound. This results in tilting or deflection of the clamping element from vertical as it is advanced into contact with a workpiece, which translates into a less than firm grip on the workpiece. Second, the bolt increases force on the workpiece only through 180°. Further turning of the bolt decreases the applied force over the next 180° and the clamping element cannot be drawn tight to the incline surface.

In U.S. Pat. No. 4,049,253 to Mandel, a toe clamp is described including a work-engaging member, a nut, an inclined clamping screw for tightening the work-engaging member to the bolt, and an inclined shoulder bolt having a non-threaded region disposed within the work-engaging member and a threaded region disposed within the nut. The toe clamp described has the work-engaging member apart from, and not received by, the nut. Only the shoulder bolt threaded lower region is received by, and receives any support from, the nut. Finally, the work-engaging member is disposed totally above the table top. The toe clamp work-engaging member described is believed to be prone to some tilting or deflection about the screw and shoulder bolts. The work-engaging member resides totally above the work table surface, blocking machine tool access to a substantial part of the workpiece, as can be seen from inspection of FIG. 4 of the reference.

What would be desirable is a workpiece clamp having improved support for the workpiece engaging member, which eliminated or reduced any deflection of the clamping element from vertical while contacting the workpiece to provide consistent workpiece placement. What would further be desirable is a workpiece clamp having most of the structure disposed below the work table surface, enabling machine tool access to a substantial portion of any parts being machined, while achieving improved support for the workpiece. What would also be desirable is a workpiece clamp having improved workpiece-holding characteristics.

SUMMARY OF THE INVENTION

The present invention provides a workpiece edge clamp for holding a workpiece or part during operations such as machining and wood working. The workpiece can be positioned between the clamp and a lip on a fixture block or work table. The clamp supplies a downward and lateral force to the piece being held. The clamp preferably has a small profile above the surface of the fixture block or work table, enabling the tool being used to access a substantial portion of the piece being machined, including all of the sides.

In preferred embodiments, the clamp includes a body having an angled recess, means for securing the body to a fixture block, an insert adapted to be slidably received within the body recess at such angle, means for drawing the insert into the body recess along the angled path defined by the recess, and a workpiece contact face secured to or formed on the insert. The body can be secured to the fixture block or work table, the workpiece placed on the fixture block or work table between a fixture block lip or work table shoulder, and the insert contact face. The insert can then be drawn into the body along a path defined by the angle of the recess, such that the contact face is simultaneously forced downward and toward the workpiece at a constant rate, thereby contacting with constantly increasing force the workpiece to secure the workpiece between the lip and contact face.

The body is preferably adapted to fit within a surface cavity in the fixture block or work table, at a suitable distance from a lip or shoulder on the fixture block or work table. The upper surface of the body in one preferred clamp is flush with the surface of the fixture block or work table. A mounting hole in one embodiment is used to secure the body to the fixture block with or without using a mounting bolt. The body has an angled recess for receiving the insert. The insert slides along the recess, as defined by the recess walls, at such angle downward and toward the workpiece. The body recess preferably has an angled threaded bore in the lower portion, which extends parallel to and beyond the recess for receiving a threaded tension bolt through the insert.

The insert has a workpiece contact face extending upward from the insert when the insert is inserted in the recess. In such position, at least a portion of the contact face extends above the work plane or work surface of the fixture block or work table, while substantially the entire body and the vast majority of the insert are below the work table or fixture block surface. This combination provides tool access to substantially the entire part during machining. The insert is sized to be received by the body recess, such that the insert receives support and proper alignment from the recess walls throughout its range of travel. With this configuration, tilting or flexing of the insert and associated workpiece contact face from vertical is minimized. This is true because the body recess cylindrical back and side walls provide substantial area for close tolerance contact with the insert while allowing desired workpiece contact face rotation for alignment with the part. The insert upper portion is preferably sized to slidably receive a tension bolt, such that when the tension bolt is rotated and tightened into the body, the insert is drawn at a continuous rate into the body and fixture block along the angle. The insert contact face is thus drawn both downward and toward the workpiece at a continuous rate, applying increasing downward and lateral force against the workpiece with each incremental rotation of the tension bolt, securing the workpiece to the fixture block.

The tension bolt is preferably concentrically disposed within the insert, and the insert concentrically disposed within the body recess, such that the tension force applied by the bolt to the insert acts to center the insert within the body recess or pathway. This centering action reduces the binding of the insert that would be imparted by a substantially off-center application of force to the insert. In a preferred embodiment, the tension bolt and insert are positively aligned at all times.

In one clamp, a retaining ring is disposed within an annular groove within the insert recess and above the tension bolt head. The tension bolt can thus act in compression between the body and insert. The tension bolt, if unconstrained, would back out of the insert recess when loosened. The tension bolt head instead rotates and presses against the retaining ring. The retaining ring thereby forces the insert out along the angle of the tension bolt and insert when loosening the clamp.

One clamp includes means for absorbing movement of the clamp, which can occur as force is applied against the clamp by the workpiece as the clamp is forced against the workpiece. One clamp has means for imparting resiliency included in the body, another in the insert, and yet another in both body and insert. Imparting resiliency to the clamp can act to absorb and compensate for some of the force applied to the clamp by the workpiece where that force could otherwise act to rotate the clamp about its center and away from the clamp contact face. Imparting resiliency compensates, at least in part, for less than perfect machining tolerances by allowing the contact face to maintain maximum surface area in contact with the workpiece. Specifically, the fit between the body and the surrounding surface cavity, and the fit between the insert and the surrounding body recess can allow a small amount of play between body and fixture block, and between insert and body, respectively. This small amount of play can translate to a small degree of variation between runs in machining workpieces.

One structure for imparting resiliency includes a relief cut in the body. In a preferred clamp, the body includes a top flange or lip and a relief cut disposed in the body underneath the flange. One such body features a relief cut wrapping around to both sides of the body, with the relief cut extending nearer the top surface as the relief cut extends around the body sides. The relief cut forms a cantilever arm or spring portion of the body, where the arm has some resiliency and acts to absorb force applied to it. In a preferred insert, a relief cut is included proximate the contact face, and forms a cantilevered arm out of at least part of the contact face. The contact face thus acts to resiliently absorb force applied by a workpiece to the contact face.

DETAILED DESCRIPTION OF THE PREFERRED EMBODIMENTS

Figure 1:
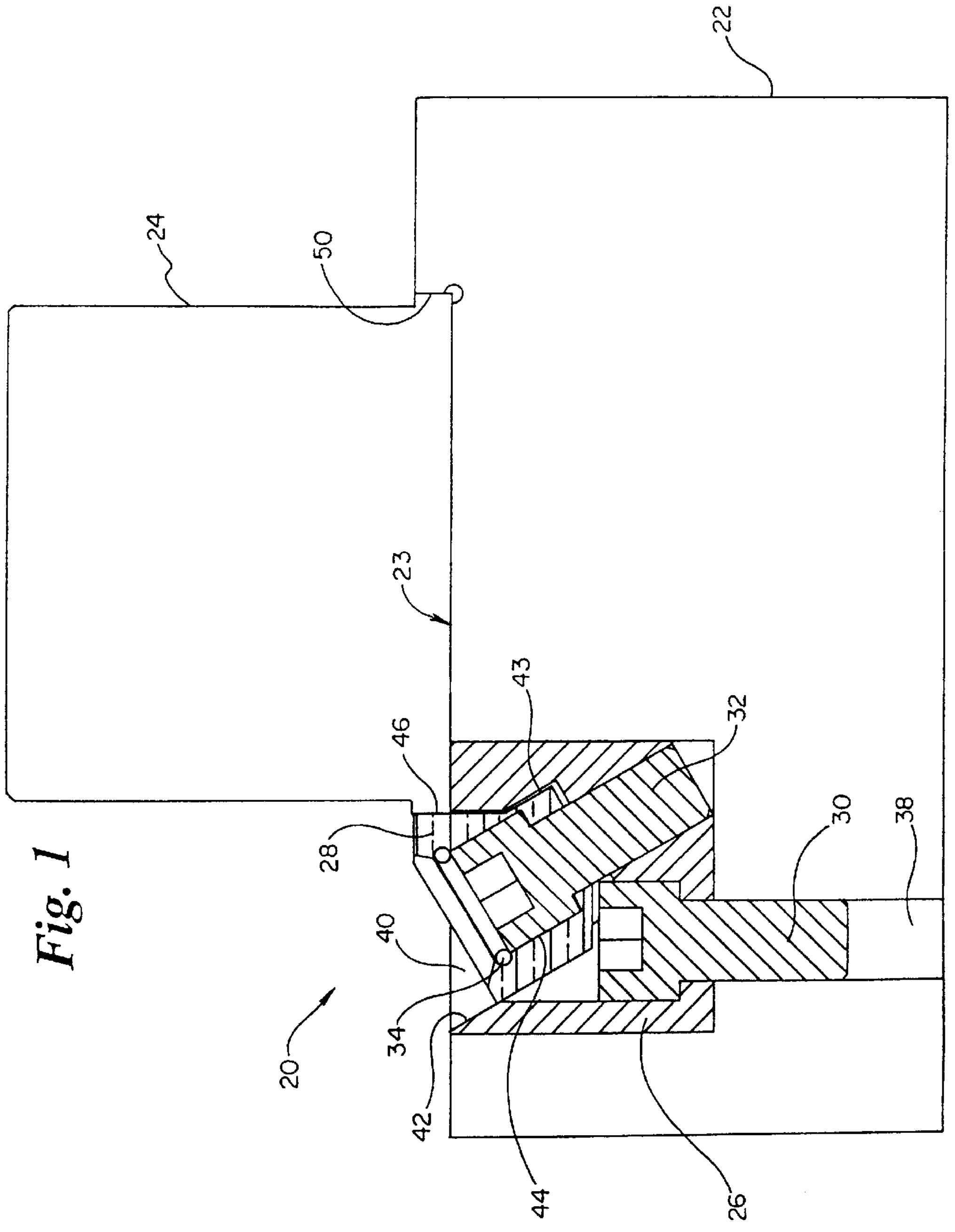
FIG. 1 is a side, longitudinal, partial cross-sectional view of a workpiece clamp mounted within a fixture block and securing a workpiece, the workpiece clamp including a body, an insert, a mounting bolt, and a tension bolt.

FIG. 1 illustrates a workpiece clamp 20 disposed within a fixture 22 and securing a sample part or workpiece 24. Fixture block 22 can be a block of material, such as steel, aluminum, plastic, wood or other solid material, suitably sized for holding both clamp and workpiece at proper locations relative to each other. Alternatively, fixture block 22 can simply be representative of a portion of a work table surface. Fixture block 22 either as depicted, or in the alternative work table, has a work plane or work surface 23 on which a workpiece 24 is to be securely placed for machining or working of any kind.

Clamp 20, in a preferred embodiment, includes a body 26, an insert 28, a mounting bolt 30, a tension bolt 32, and a retaining ring or clip 34. Body 26 can be secured to fixture block 22 with mounting bolt 30 threadably inserted within a mounting hole 38. Insert 28 is inserted within a body recess 40 and slidably received by congruent body walls 42 and 43. Insert 28 can be threadably secured within body 26 by operation of tension bolt 32 within an insert bore 44. Tension bolt 32 can be secured within insert 28 with retainer or retaining ring 34. Workpiece 24 is secured to fixture block 22 between a workpiece contact face 46 on insert 28 and a fixture block holding lip 50. The holding lip 50 can be any shoulder or projection from the work surface 23 which provides an opposing face to the contact face 46 on the insert 28 so as to allow abutment of the workpiece with such faces. In the embodiment illustrated, body 26 lies substantially below work plane 23, as does the vast majority of insert 28, with only contact face 46 extending above the work plane.

Two important features of the present clamp design are well illustrated by the above general description. First, the portion of the clamp 20, which extends above the work surface 23, is minimized. As illustrated in FIG. 1, only a portion of the insert 28, which includes at least a portion of the contact face 46, actually projects above the work plane or surface. With this design, very small parts can be clamped with the present invention, while minimizing clamp interference with any tool which is machining the part 24. Yet, even with such minimum portion of the clamp 20 protruding above the work plane surface 23, the overall clamp 20 can be sized to produce substantial force against the part 24 because the body 26 and insert 28 are not limited in size by potential interference with the part to be machined.

A second important feature of the clamp 20, illustrated by the general description above, is the combination of the insert 28 being slidably disposed within the angled, generally cylindrical body recess 40 of body 26. The recess is defined by walls which may be sized for relatively close tolerance with the opposing surfaces of the insert 28 when slidably received within such recess 40. This not only reduces or minimizes the tilting or deflection of the contact face 46 away from vertical when it initially contacts the sample part, but also provides substantial areas of surface contact between the insert and recess walls (especially the back recess wall) so that high degrees of force may be applied to the contact face 46 relative to the sample part 24 without flexing of the clamp 20 or associated contact face 46 away from the part 24.

Figure 2:
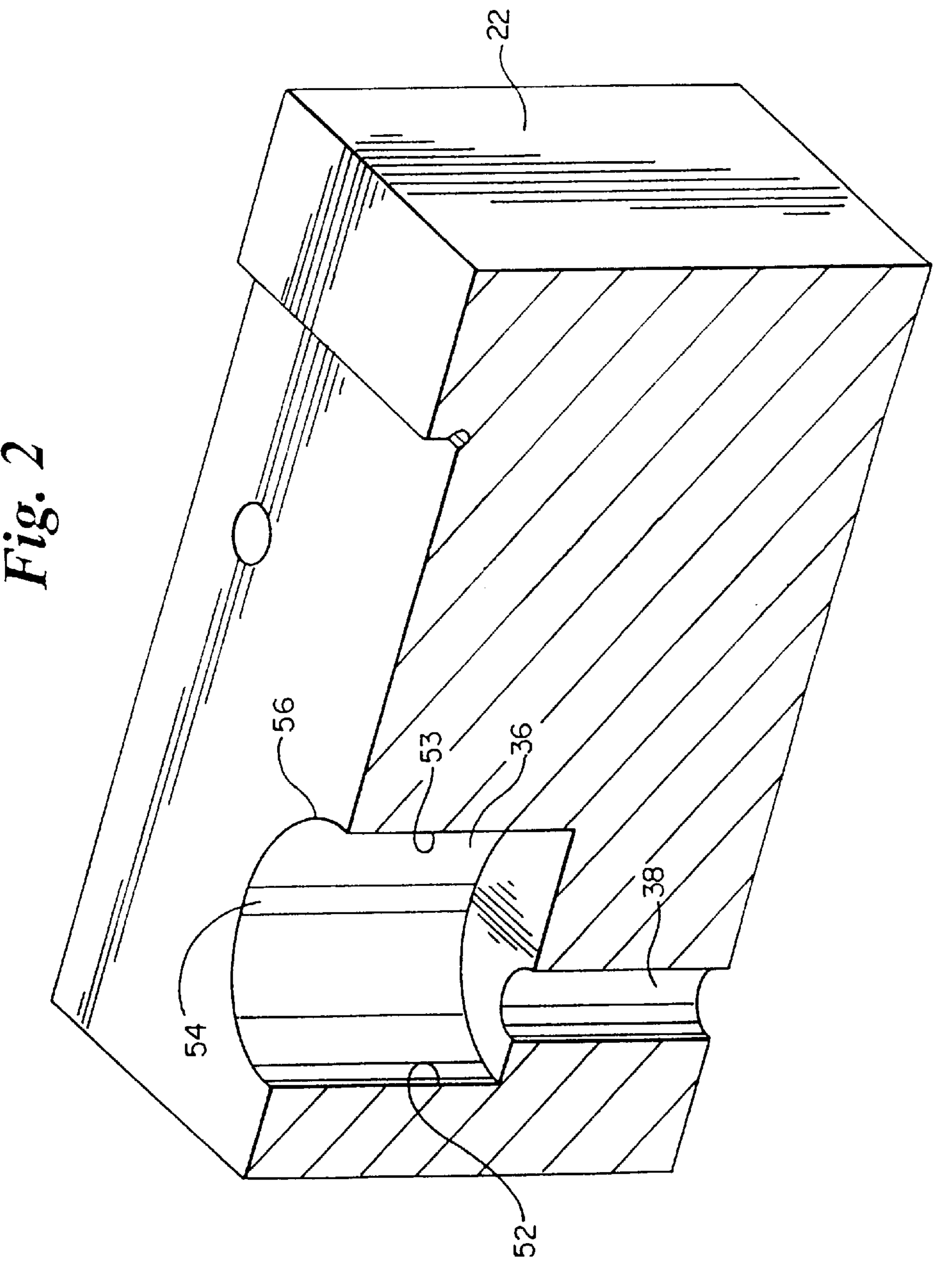
FIG. 2 is a side cut-away perspective view of the fixture block of FIG. 1, the block having a cavity to receive the body of FIG. 1 and a mounting hole to receive the mounting bolt of FIG. 1.

Referring now to FIG. 2, fixture block 22 is further illustrated, including clamp-mounting cavity 36, having generally congruent or opposing cavity walls 52 and 53, and cavity wall flat portion 54 (a second opposing flat portion is included opposite flat portion 54, but not depicted). Mounting hole 38 extends downward from or deeper within clamp-mounting cavity 36. In the embodiment illustrated, clamp-mounting cavity 36 has a surface opening 56 formed from two semi-circles separated by flat portion 54. Flat portion 54 operates to prevent rotation of the clamp body within the cavity, if so desired, as would otherwise be possible with a perfectly circular cavity.

Figure 3:
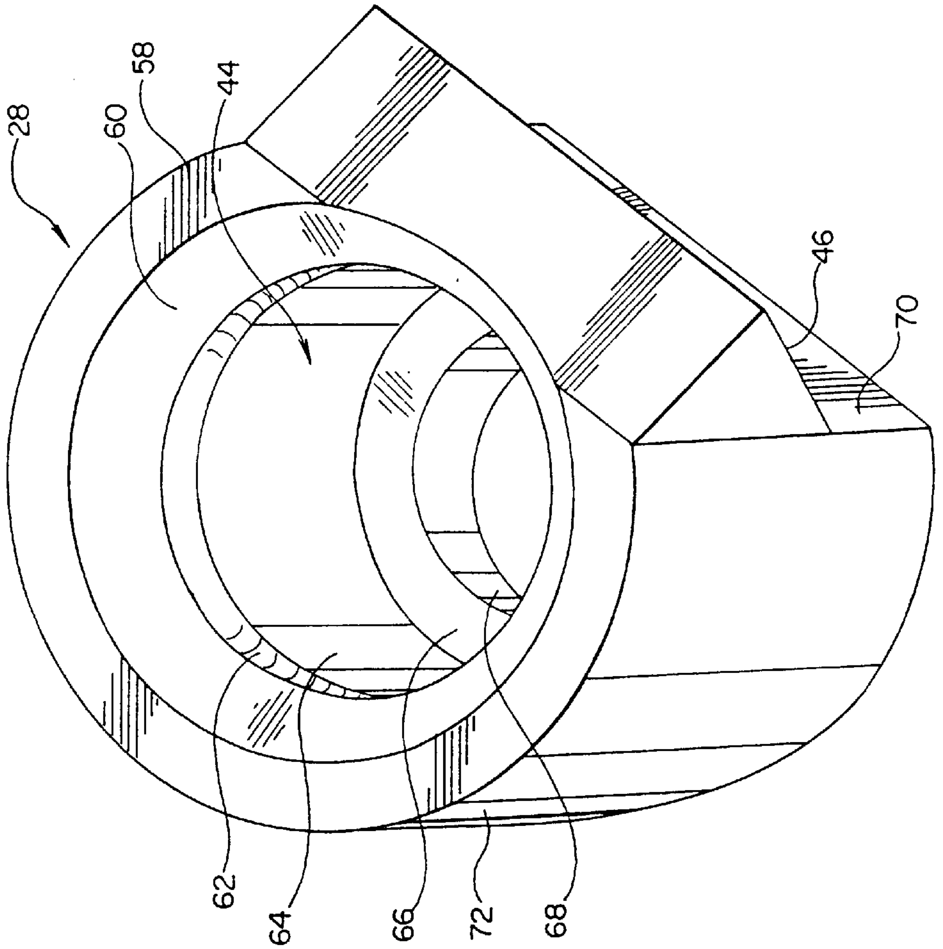
FIG. 3 is a perspective view of the insert of FIG. 1, including a bore therethrough to receive the tension bolt of FIG. 1.

Referring now to FIG. 3, insert 28 is further illustrated, having a substantially flat top surface 58 followed inward and downward by a chamfer 60. Insert bore 44 includes a retaining groove 62, an upper wide bore portion 64, a shoulder region 66, and a lower narrow portion 68. Chamfer 60 can be used to aid in engaging a wrench in the tension bolt 32 head. Retaining groove 62 is used in a preferred embodiment to contain a retainer or retaining ring. Bore upper region 64 is wide enough to receive the head of tension bolt 32. Bore shoulder region 66 can act to transmit force from tension bolt 32 downward through the insert. Bore narrow portion 68 is preferably sized to receive the lower portion of tension bolt 32. Workpiece contact face 46 is further illustrated as formed on insert 28, such that when insert 28 is guided by the angled recess 40 of body 26, such contact face is generally perpendicular to the work surface 23 and at least a portion of the contact face 46 protrudes above the work surface 23. Insert 28 is illustrated as having a lower front surface 70 and a back surface 72.

Figure 4:
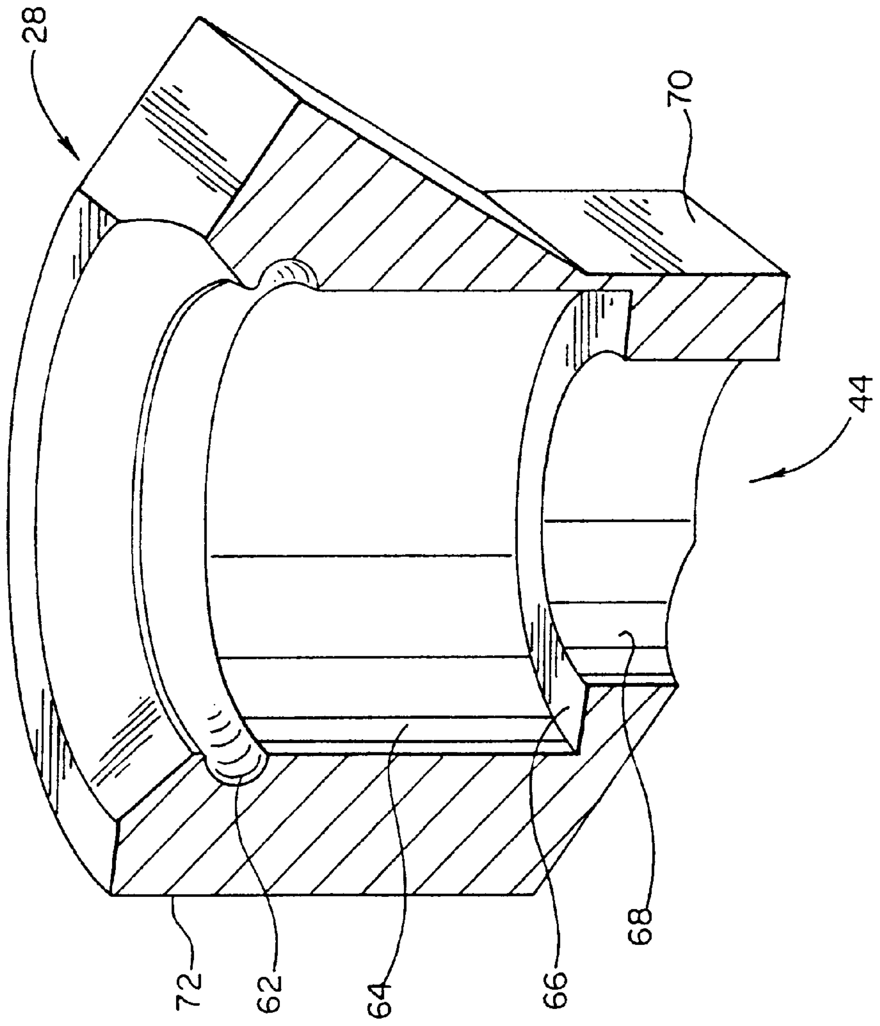
FIG. 4 is a side cut-away perspective view of the insert of FIG. 3.

Referring now to FIG. 4, insert 28 and bore 44 are illustrated in more detail. As shown, retaining groove 62 is suitable for disposing a retaining ring or clip therein. Bore upper wide region 64, bore shoulder 66, and bore lower narrow region 68 are further illustrated. Insert lower front surface 70 and insert back surface 72 are also shown. Insert faces 70 and 72 are preferably sized and shaped so as to be slidably received and supported by corresponding inside faces of the body recess 40.

Figure 5:
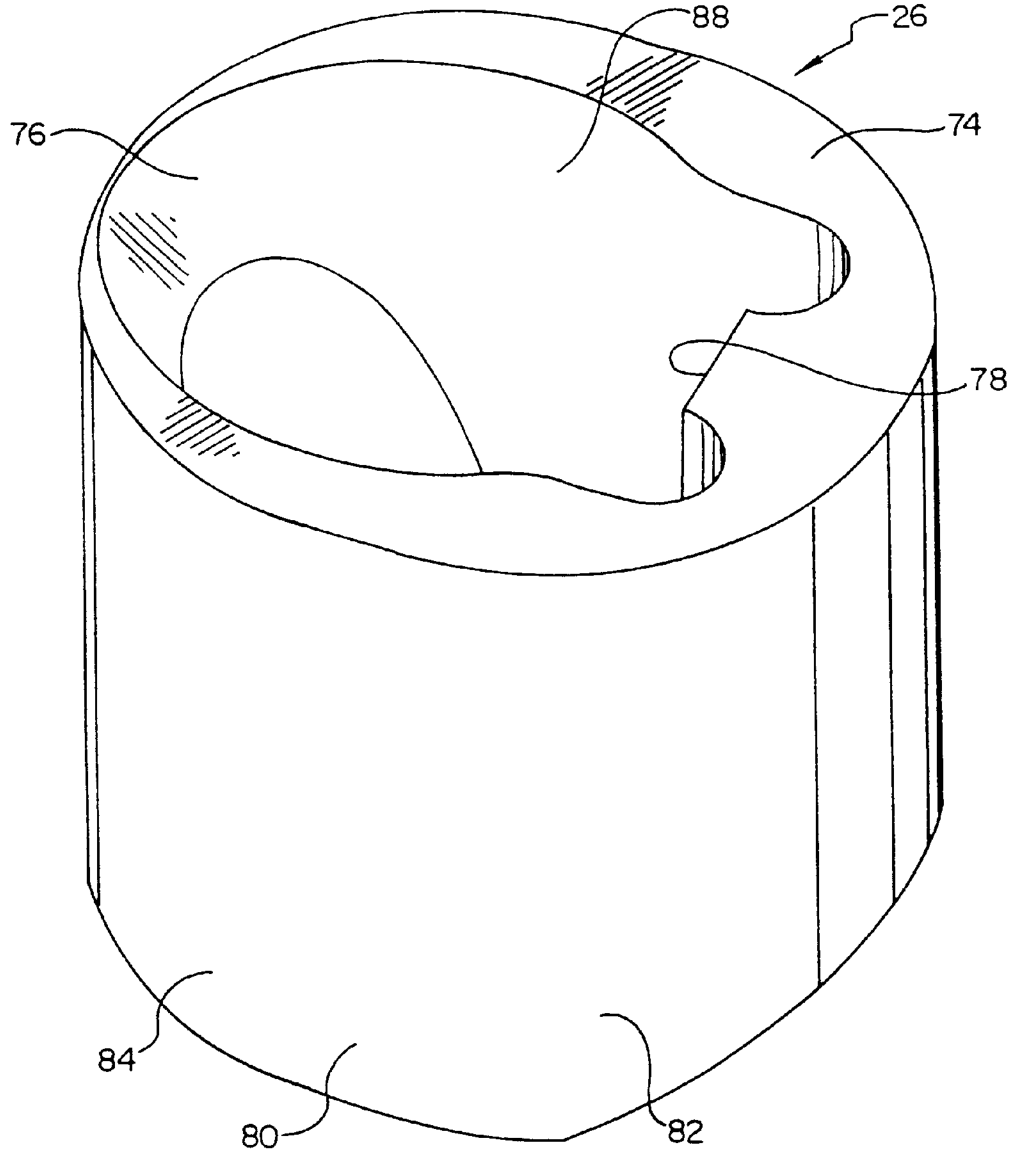
FIG. 5 is a perspective view of the body of FIG. 1, adapted to receive the insert of FIG. 3 and adapted to be received by the fixture block of FIG. 2.

Referring now to FIG. 5, body 26 is illustrated, having a top surface 74, a front stop 78, an angled back wall 76, and side walls 88. The side external face of body 26 includes a front curved portion 82, a side flat portion 80, and a back curved portion 84. In a preferred embodiment, front portion 82 and back portion 84 have a semi-circular contour separated by flat region 80. Flat region 80 prevents body 26 from rotating about its central axis when inserted in clamp mounting cavity 36 due to the lack of circular symmetry.

Figure 6:
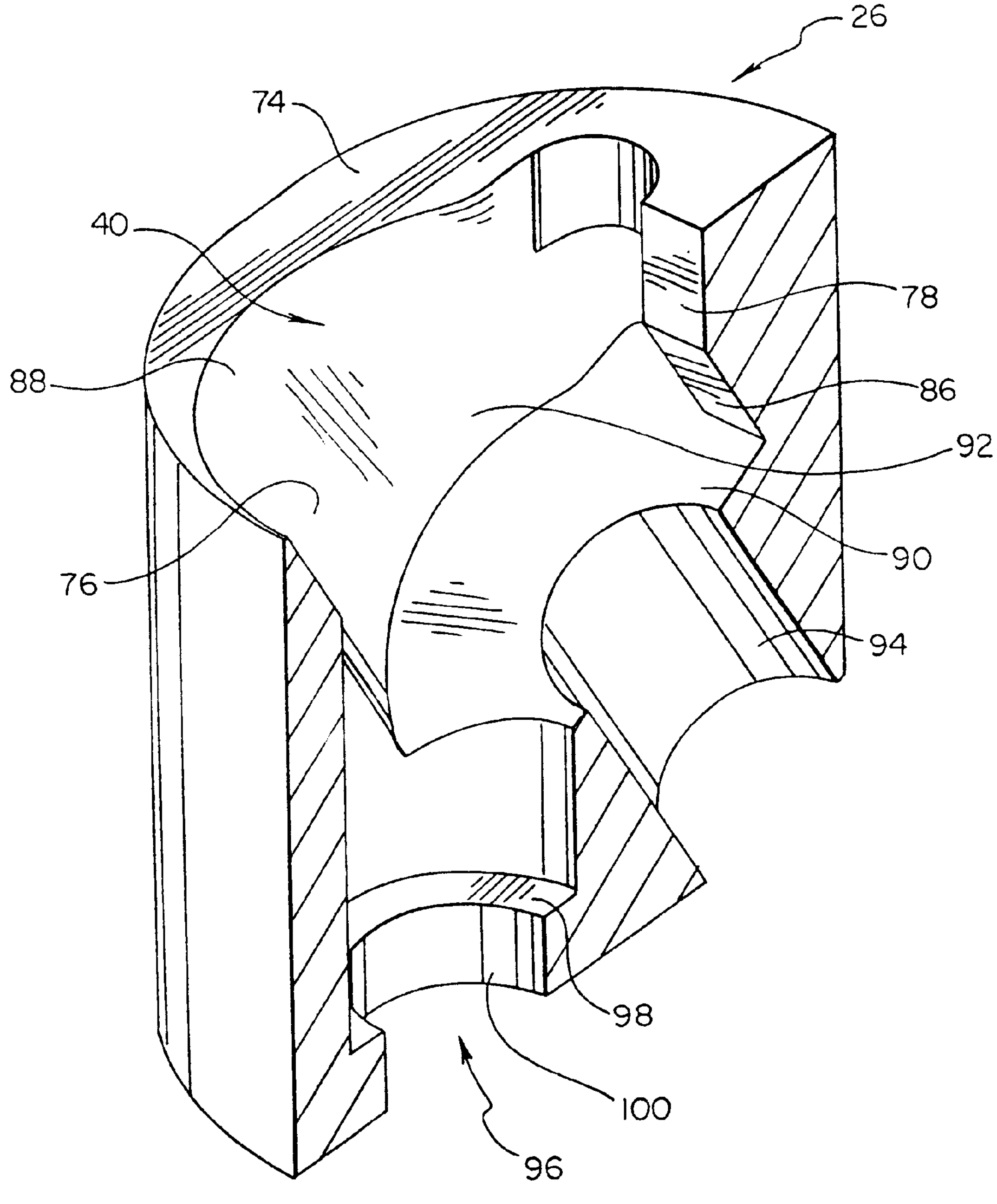
FIG. 6 is a perspective cut-away view of the body of FIG. 5.

Referring now to FIG. 6, body 26 is further illustrated, in a cut-away view to detail internal elements that in use cooperate with insert 28. Body recess 40 extends from top surface 74 into body 26 as defined by back wall 76, side walls 88, and a front wall 86. Walls 76, 88, and 86 act to slidably receive and support insert 28 therein for angled travel therein. Body recess 40 further includes a tension bolt shoulder region 90, which is disposed between a body recess upper region 92 and a body recess lower region 94. Lower region 94 is preferably threaded to receive a threaded tension member or bolt. Body 26 also includes a mounting bore 96, including a mounting bore shoulder region 98 and a mounting bore lower region 100. Mounting bore 96 can receive a mounting bolt therethrough, where the mounting bolt is threadably secured to a fixture block or work table.

Figure 7:
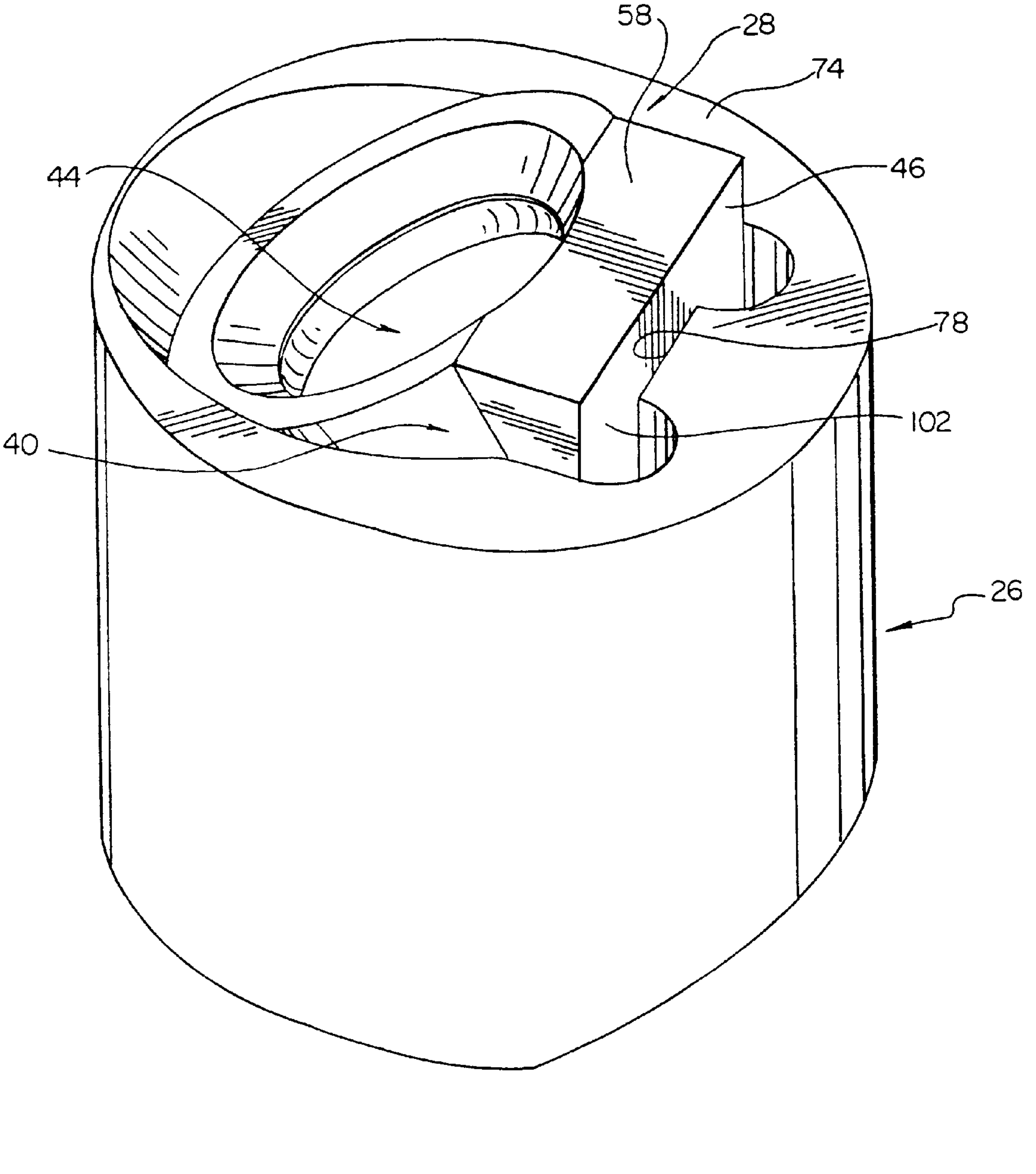
FIG. 7 is a perspective view of the insert of FIG. 3 mounted within the body of FIG. 5.

Referring now to FIG. 7, insert 28 is shown disposed within body recess 40 of body 26. Insert top surface 58 is shown extending above body top surface 74. Insert contact face 46 is shown disposed close to, but not touching, body stop 78. Insert contact face 46 and body front stop 78 are separated by a gap 102. As insert 28 is slidably advanced into body 26, gap 102 becomes smaller and insert top surface 58 is lowered. In preferred embodiments, the portion of insert 28 protruding above body top surface 74 is minimized. When insert 28 is fully inserted within body 26, only a small portion of insert top surface 58 is above body top surface 74. In this embodiment, only that portion of insert 28 including contact face 46 protrudes above body top surface 74 when insert 28 is fully inserted into body 26. In another preferred embodiment, less than half the insert protrudes above the fixture block surface when the insert is fully inserted. In one preferred embodiment, less than one inch of the insert, including the contact face, extends above the body surface. In another preferred embodiment, less than one-half inch extends above the body surface. In all embodiments, the majority of insert 28 and substantially the entire body 26 are at or below the work surface 23 when in use.

Figure 8:
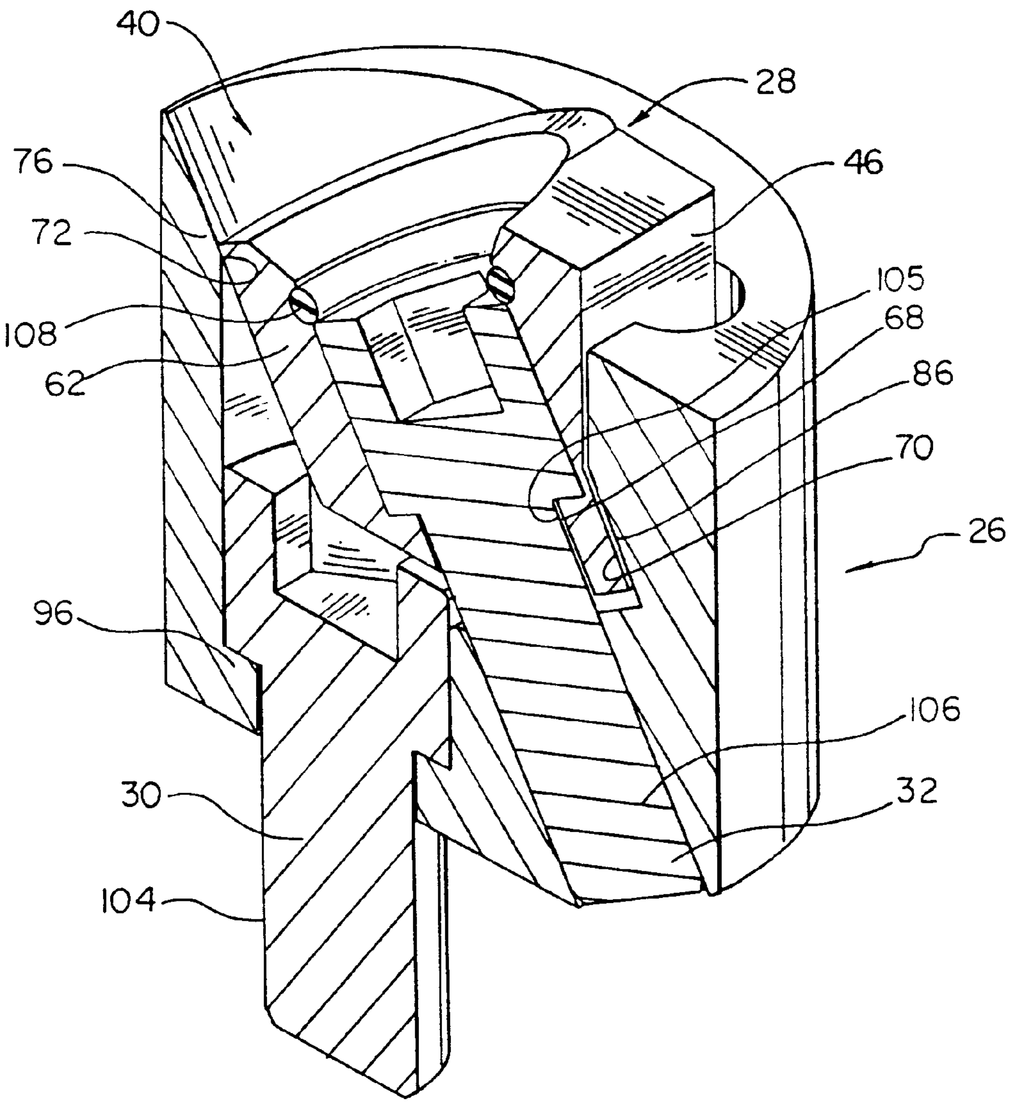
FIG. 8 is a cut-away perspective view of the body of FIG. 1 having the mounting bolt inserted therethrough and the insert disposed therein, the insert having the tension bolt inserted therethrough.

Referring now to FIG. 8, insert 28 is shown inserted within body 26. Body 26 has mounting bolt 30 extended therethrough and through body recess mounting bore 96. In a preferred embodiment, mounting bolt 30 includes a lower, threaded region 104 for securely attaching body 26 to a fixture block. Tension bolt 32 is illustrated disposed through insert 28 and body 26. In a preferred embodiment, bolt 32 is sized to freely rotate within an unthreaded insert bore narrow region 68 and a lower threaded region 106 for securing bolt 32 within body 26 and applying a tension force to tension bolt 32 and insert 28. In a preferred embodiment, both mounting bolt 30 and tension bolt 32 have hexagonal head socket cavities suitable for tightening with a hex key. A retaining ring 108 is shown disposed within retaining groove 62. Retaining ring 108 operates to prevent tension bolt 32 from being withdrawn upward through insert 28. Tension bolt 32, when rotated to withdraw tension bolt 32 from body 26, rotates and presses against retaining ring 108, which is fixed within retaining groove 62, thereby causing insert 28 to be forced upward and outward of body 26. This enables the contact face to be freed from the workpiece.

FIG. 8 illustrates how insert 28 is substantially concentrically disposed within body recess 40 and is slidably received within the congruent walls of body recess 40. Insert lower front face 70 may be seen to be slidably disposed proximate body front wall 86. Insert upper back face 72 may be seen to be disposed proximate body back inside wall 76. Inspection of FIGS. 5 and 6 illustrates that body side wall 88 also slidably receives insert 28. In this way, insert 28 is supported within body 26 as the insert is advanced and withdrawn from the body. Substantial support for the insert 28 and associated contact face 46 is provided by the large area of contact between the back wall 76 of the recess 40 with the insert 28 as the contact face 46 is tightened against the workpiece 24. This combination prevents or minimizes the insert 28, and contact face 46 from bending back away from the part as force is increased. This also acts to prevent contact face deflection from vertical and provide a consistent tight fit between contact face 46 and the workpiece being held. At the same time, the contact face 46 and insert can be rotated to accommodate the shape of the workpiece to be contacted. As can be seen from inspection of FIG. 8, tension bolt 32 has a wide range of movement through its oblique angle relative to the body. This acts to provide a range of increasing force which can be brought to bear on a workpiece through contact face 46. Tightening tension bolt 32 can act to advance contact face 46 against the workpiece being held with continuously increased force through successive incremental rotation of bolt 32.

Referring again to FIG. 8, an alternate means for drawing an insert into a body may be discussed. In this alternate embodiment, a tension bolt is provided having an upper threaded region, an intermediate unthreaded region, and a lower threaded region, the lower threaded region having an opposite thread direction relative to the upper region. In this embodiment, regions corresponding to tension bolt region 105 and insert bore region 68 in FIG. 8 are also threaded. Corresponding threading is provided in both body and insert, such that rotating the tension bolt in a first direction acts to draw insert and body together, and rotating tension bolt in a second direction acts to push insert and body apart. The tension bolt, body, and insert thus cooperatively act together as a turnbuckle, providing both tension forces to hold the workpiece and compressive forces to release the workpiece.

Figure 9:
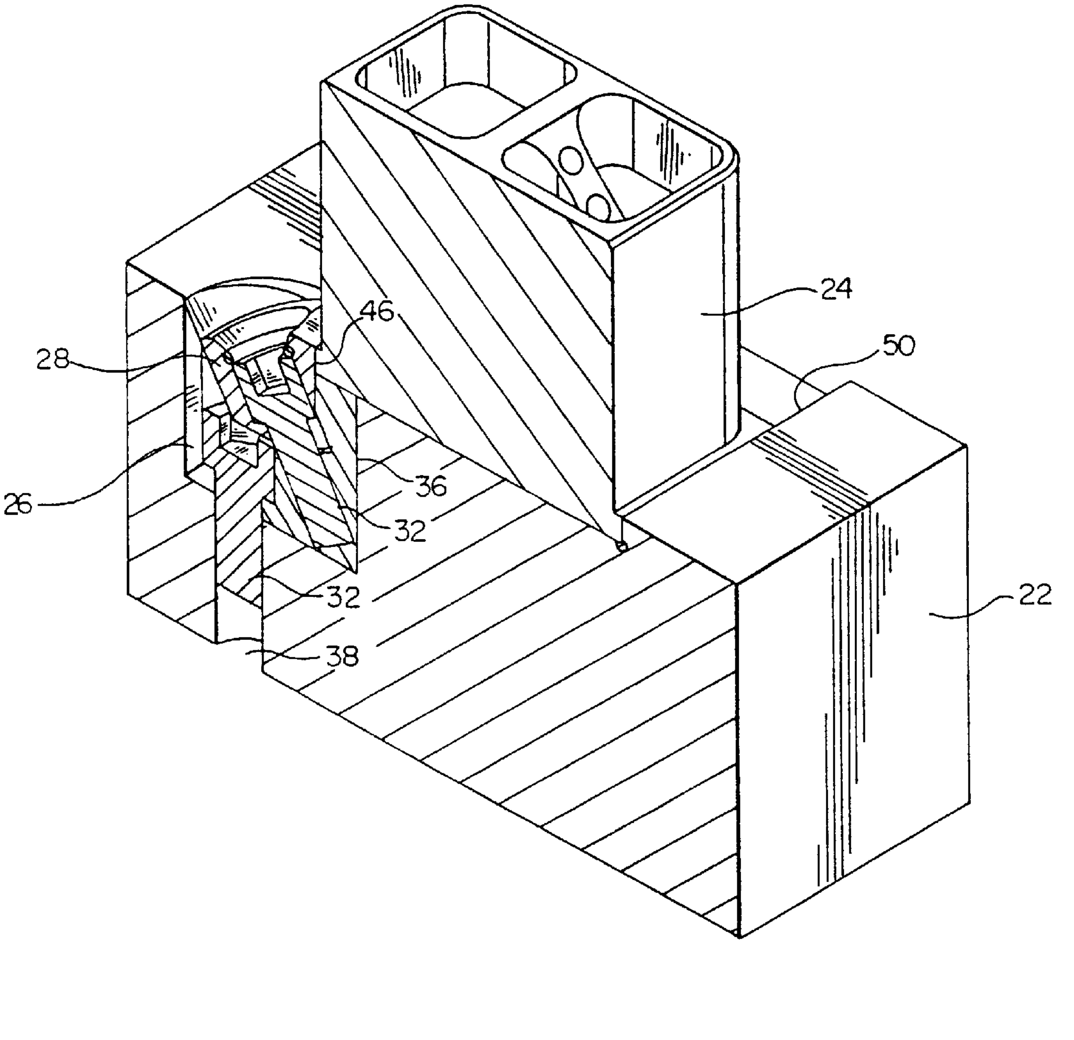
FIG. 9 is a perspective cut-away view of the body and insert of FIG. 8 disposed within a fixture block and holding a workpiece.

Referring now to FIG. 9, workpiece 24 may be seen to be held between fixture block holding lip 50 and contact face 46. Body 26 is secured to fixture block 22 with mounting bolt 32 extended through mounting hole 38. Bolt 32 is preferably threadably secured within hole 38. Tension bolt 32 may be seen to have drawn insert 28 downward and forward into body 26. As a result, contact face 46 has been drawn downward and forward toward workpiece 24. In the example shown, only a small portion of insert 28 and contact face 46 extend above the work surface of fixture block 22. This enables machine tools to have free access to the majority of or substantially all of workpiece 24.

In a preferred embodiment, body 26 is secured to fixture block 22 through operation of a threaded mounting bolt. When contact face 46 is drawn downward and forward into body 26, an equal and opposite reaction force acts to force body 26 back into the wall of mounting cavity 36. This equal and opposite force, however, would act to rotate body 26 backwards within cavity 36. Thus, body 26, even without a threaded mounting bolt, would be forcibly held within cavity 36 when the clamp is tightened. In an alternative embodiment, body 26 is therefore not secured to fixture block 22 through any mounting bolt. Rather, the tight tolerance fit between body 26 and the mounting recess 36 in conjunction with force created when tension bolt 32 is tightened, drawing down workpiece 24, are relied on to maintain the body 26 with the cavity 36. In an alternative embodiment, body 26 is track- mounted on a rail or within an inverted T-groove in a work table. This enables a wider range of adjustment distance between contact face 46 and a fixture block lip 50.

Figure 10:
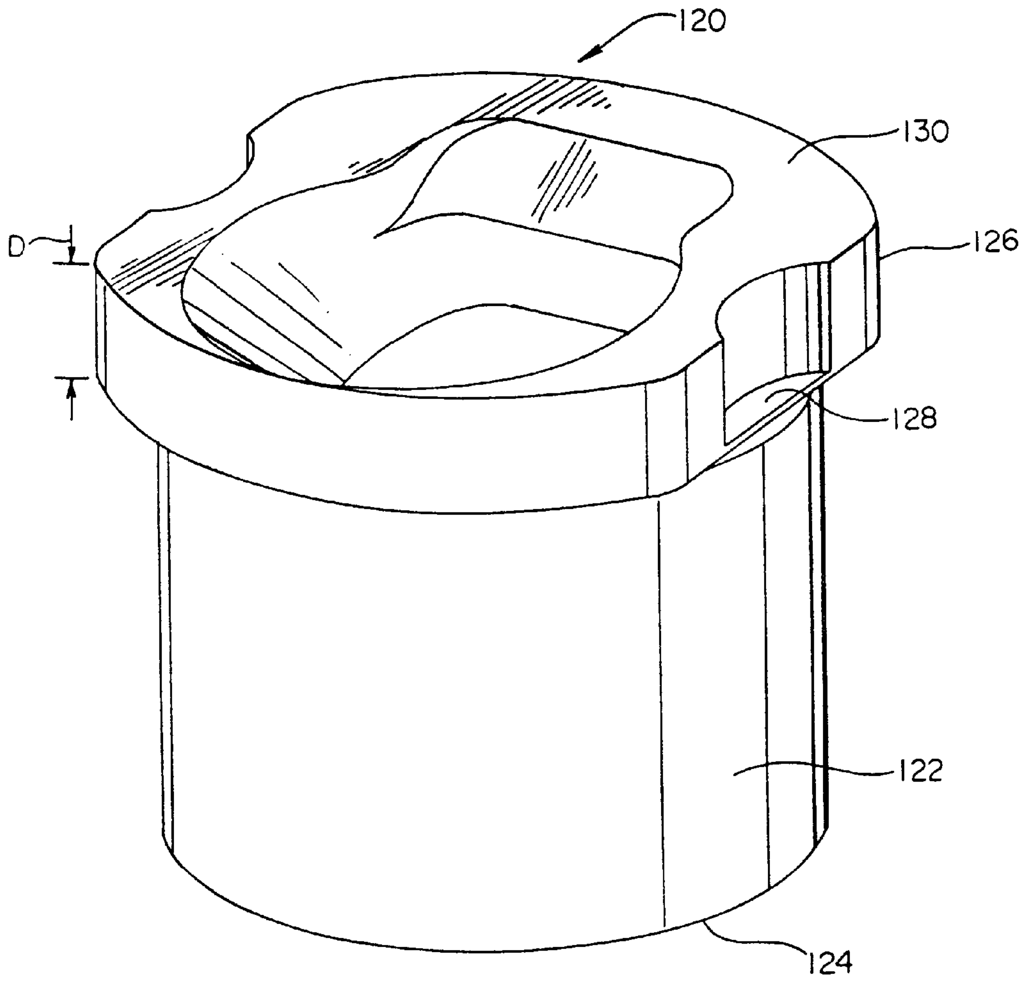
FIG. 10 is a perspective view of an alternative body having a generally round shape and upper flange.

Referring now to FIG. 10, another body 120 depicting the present invention is illustrated. Body 120 has a circular outside profile as embodied in walls 122 and round bottom edge 124. Body 120, having a circular bottom profile, can be dropped into a round hole in a fixture block or work table. Round holes for mounting are more easily made and machined to tight tolerances than oval holes or oblong holes formed of opposing semicircles joined by side flat regions. Oval mounting cavities are often formed by an end mill, with the tool scribing a path to form the desired shape. As tools may deflect to a degree, the tolerance of the cavity may be less than desired. In contrast, a round mounting cavity can be drilled by a bit with a fixed diameter. The round cavity is more easily formed and can more easily have tighter tolerance than a similar sized oval cavity. The round cavity into which body 120 is inserted also allows for correcting the angle between the contact face and lip if they are not parallel in the previous embodiment.

Body 120 can also include an upper lip or flange 126 and an upper surface 130 having a larger profile than bottom round edge 124. Lip 126, typically being wider than the mounting cavity surface opening, can act to prevent body 120 from dropping to the bottom of the mounting cavity, allowing use of mounting cavities having less precise depths. Inspection of FIG. 10 shows that a workpiece may rest upon the surface 130 of the body 120, as workpiece 24 rests upon the upper surface of body 26. Lip 126 can act to raise a workpiece slightly above the surface of the fixture block or work table, allowing a tool to penetrate through the bottom of the work piece without contacting the work table surface. In one embodiment, lip 126 has a thickness indicated at "D" in FIG. 10, of about 5% to 20% of the total body height. An upper lip such as 126 still allows substantially all of body 120 to remain below the work surface of the fixture block, having only a small portion extending above the surface.

As previously described, some bodies according to the present invention may at least be partially secured within a mounting cavity by the binding action of the body generated as clamping force is applied to the workpiece, thereby pivoting the body away from the workpiece within the mounting cavity. This binding action can be supplemented with a mounting bolt further securing the body to the work fixture. Body 120 illustrates another method for further securing a body to a work fixture. Upper lip 126 includes an opposing pair of ears 128. Ears 128 can be used to further secure body 120 to a fixture block with button head screws. A round mounting cavity can be drilled in a fixture block, along with two smaller holes on either side of body 120. Body 120 is dropped into place and a pair of screws tightened into the holes, the screw heads bearing down on ears 128, thereby securing body 120, without requiring a mounting bolt 32.

Figure 11:
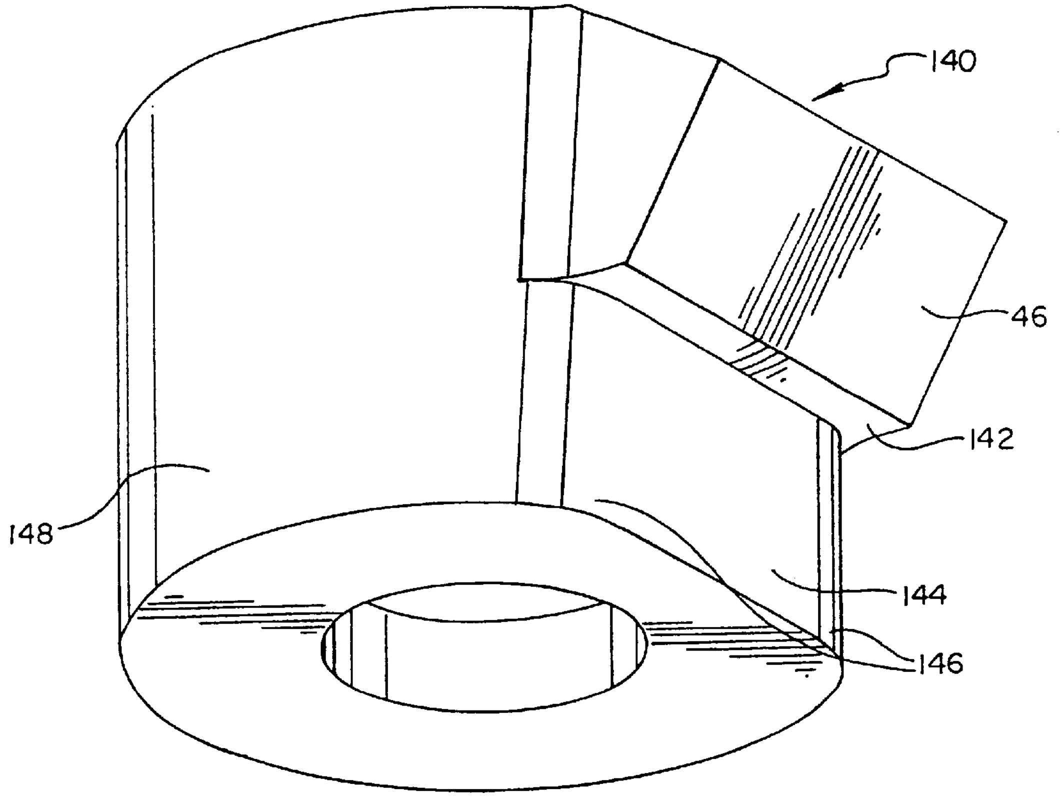
FIG. 11 is a perspective view of an alternative insert having an intermediate front ledge on the workpiece contact face.
Figure 12:
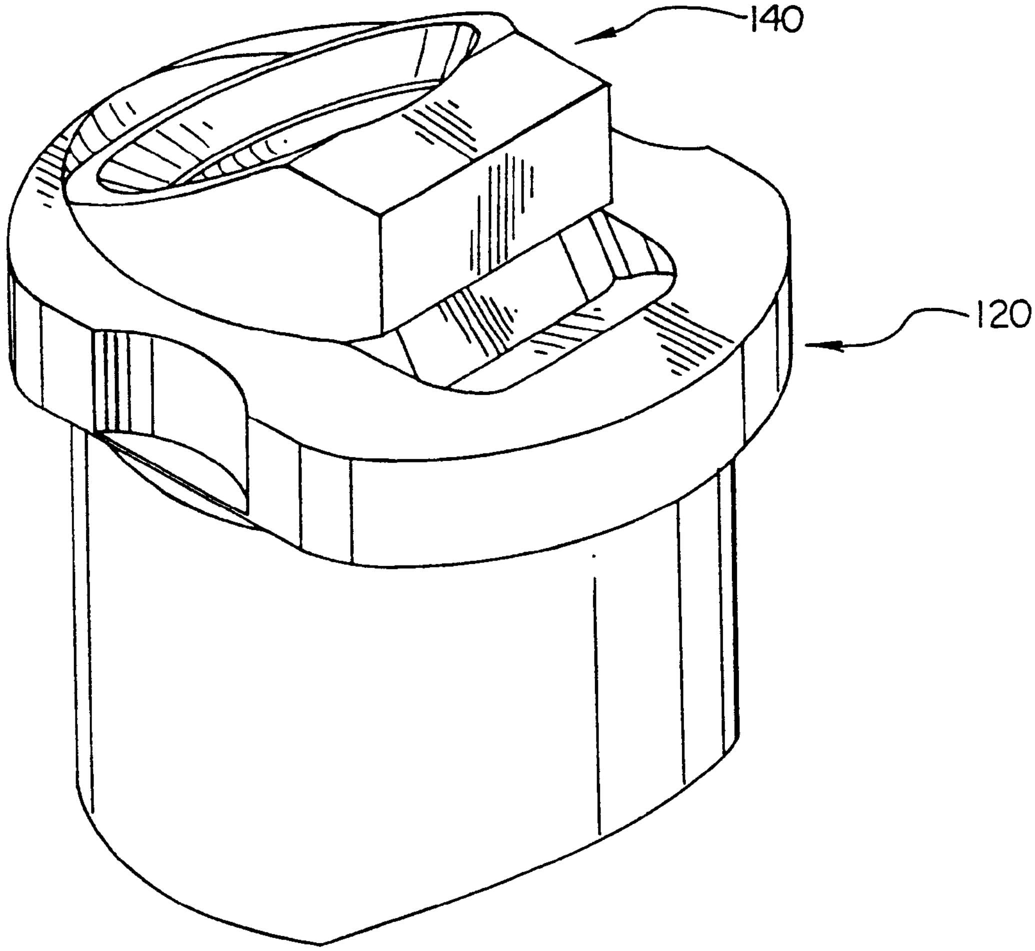
FIG. 12 is a perspective view of the alternative insert of FIG. 11 disposed within the alternative body of FIG. 10.

Referring now to FIG. 11, another insert 140 is illustrated. Insert 140 has side walls 148, a front outside wall 144, workpiece contact face 46, and an intermediate ledge 142 between front outside wall 144 and contact face 46. Ledge 142 establishes a discontinuity between the insert contact face and the insert lower body, making contact face 46 easier to machine into a desired shape, such as an arcuate shape designed to better hold a particular workpiece. Insert 140 also includes radial transitions 146 between side walls 148 and front wall 144. FIG. 12 further illustrates insert 140, disposed within body 120.

Figure 13:
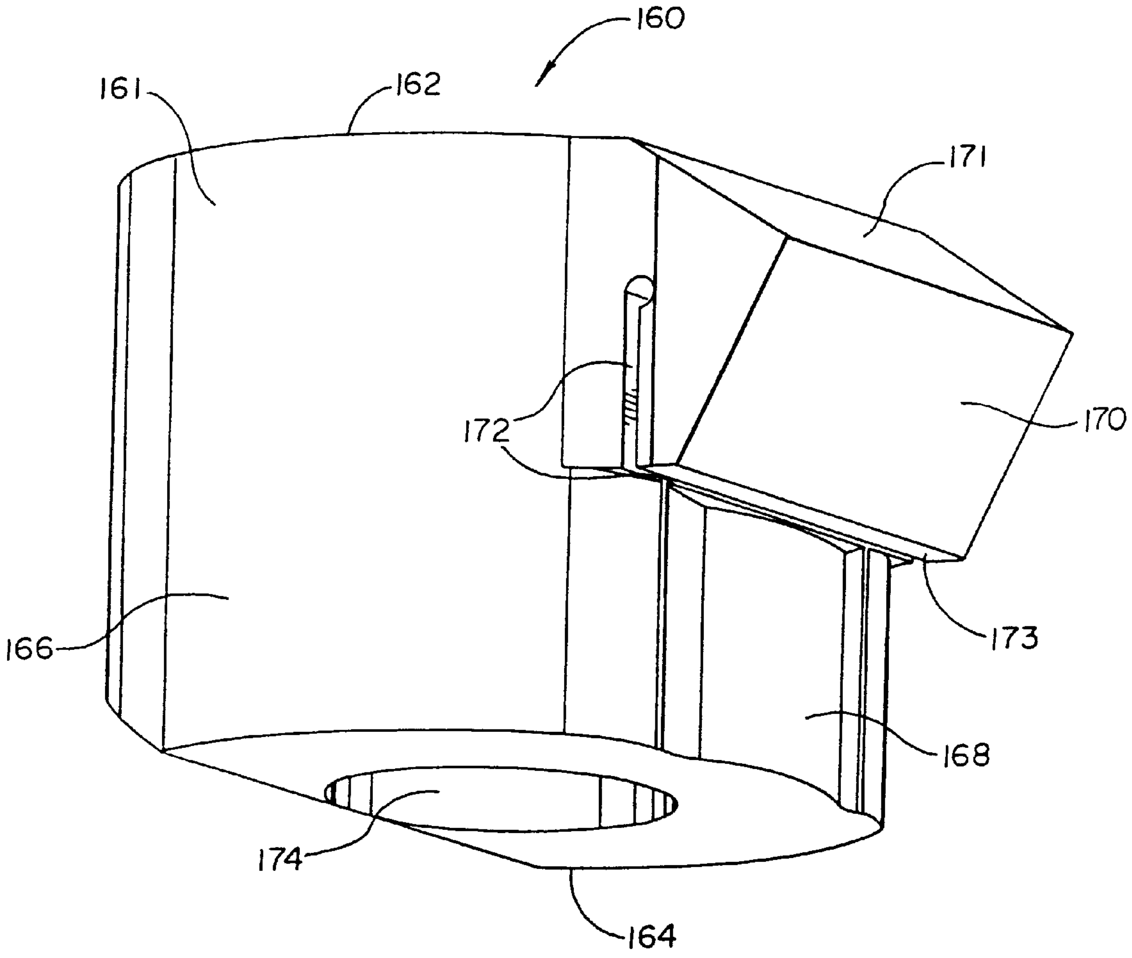
FIG. 13 is a fragmentary, perspective view of an insert including a relief cut.

Referring now to FIG. 13, another embodiment of the invention is illustrated in a clamp insert 160, having a top surface 162, a bottom surface 164, a front surface 168, and a side 166. In the embodiment illustrated, clamp insert 160 includes a nominally cylindrical portion 161 and an insert bore 174 extending therethrough. Clamp insert 160 has a nominally triangular solid contact portion 171 having a contact face 170 disposed on the front and an intermediate ledge 173 disposed underneath ledge 173, having a substantially coplanar orientation to top surface 162. Contact face 170 is preferably integrally formed with nominally cylindrical portion 161 of insert 160. A relief cut 172 is formed in insert 160 proximate contact face 170. In the example shown, relief cut 172 is disposed between solid contact portion 171 and cylindrical portion 161.

Relief cut 172 forms a recess or cavity in insert 160, which creates a resilient, cantilevered member which can act to absorb or oppose forces brought to bear on contact face 170. This relief cut allows the contact face 170 to maintain maximum surface area in contact with the workpiece. In a preferred embodiment, relief cut 172 forms a channel oriented along a plane, where the plane is substantially perpendicular to the plane of top surface 162. In one embodiment, the relief cut is substantially cylindrical and congruent with insert bore 174. In the embodiment illustrated, relief cut 172 is substantially planar, being substantially coplanar to front surface 168.

Figure 14:
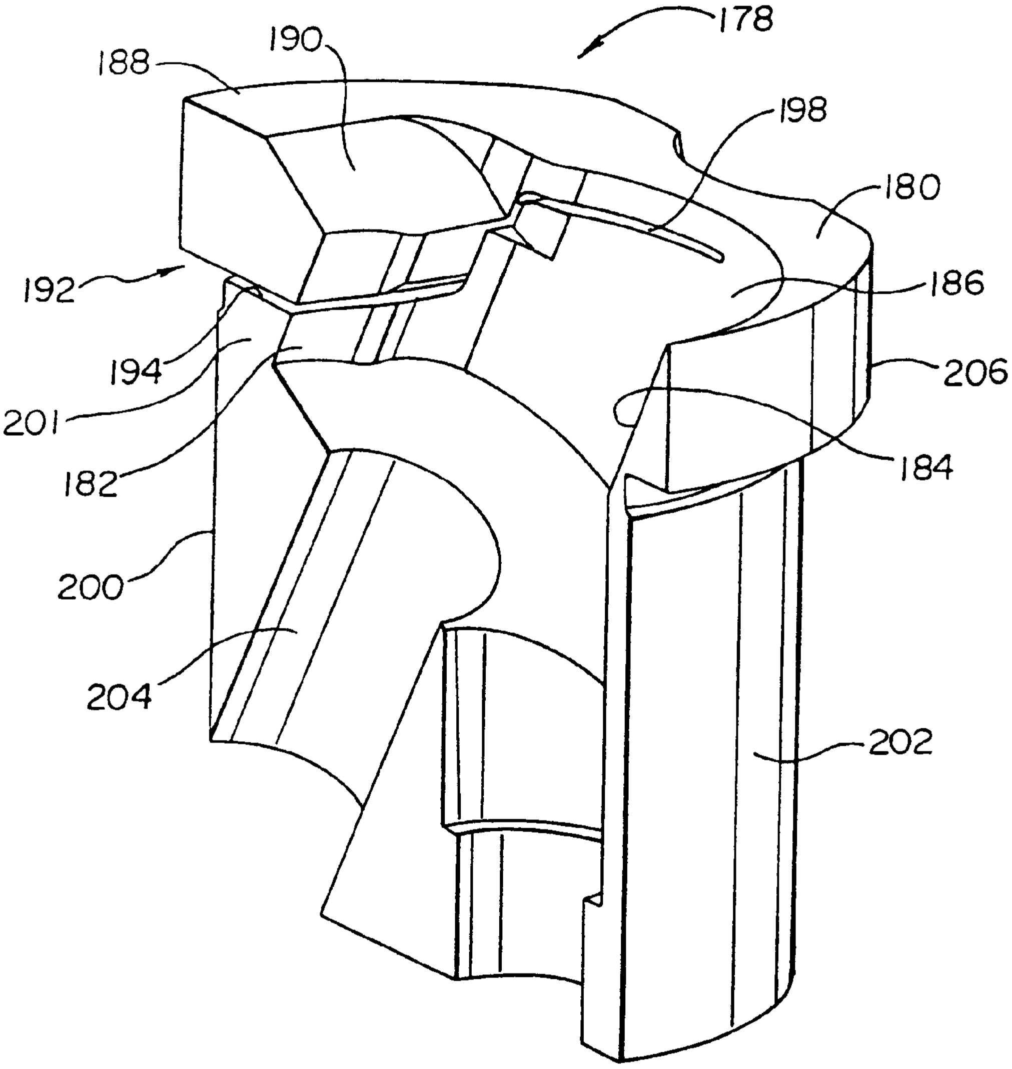
FIG. 14 is a fragmentary, cutaway, perspective view of a body including a relief cut.

Referring now to FIG. 14, a clamp body 178 is illustrated, also having a relief cut therein. Body 178 includes a front portion 200, a front wall 201, a back portion 202, an upper lip or flange 206, a top surface 180, a top front portion 188, and a top front angled and recessed land 190. Land 190 can receive a part of the insert in some embodiments, such as insert front intermediate ledge 173 illustrated in FIG. 13. Body 178 also includes, internally, a front stop portion 182, an angled back wall 184, side walls 186, and a body recess 204 for receiving an insert such as insert 160. Body 178 has a relief cut 192 formed in front wall 201 and side walls 186. In one embodiment, the relief cut is formed in only the front wall. In the embodiment illustrated, relief cut 192 is formed in both front and side walls, wrapping around a portion of the body on both sides. Relief cut 192 can include, as illustrated, a front portion 194, a rising transition portion 196 (illustrated in FIG. 15), and a side portion 198. In the embodiment illustrated, relief cut front portion 194 and side portion 198 have a planar orientation substantially co-planar to top surface 180.

Figure 15:
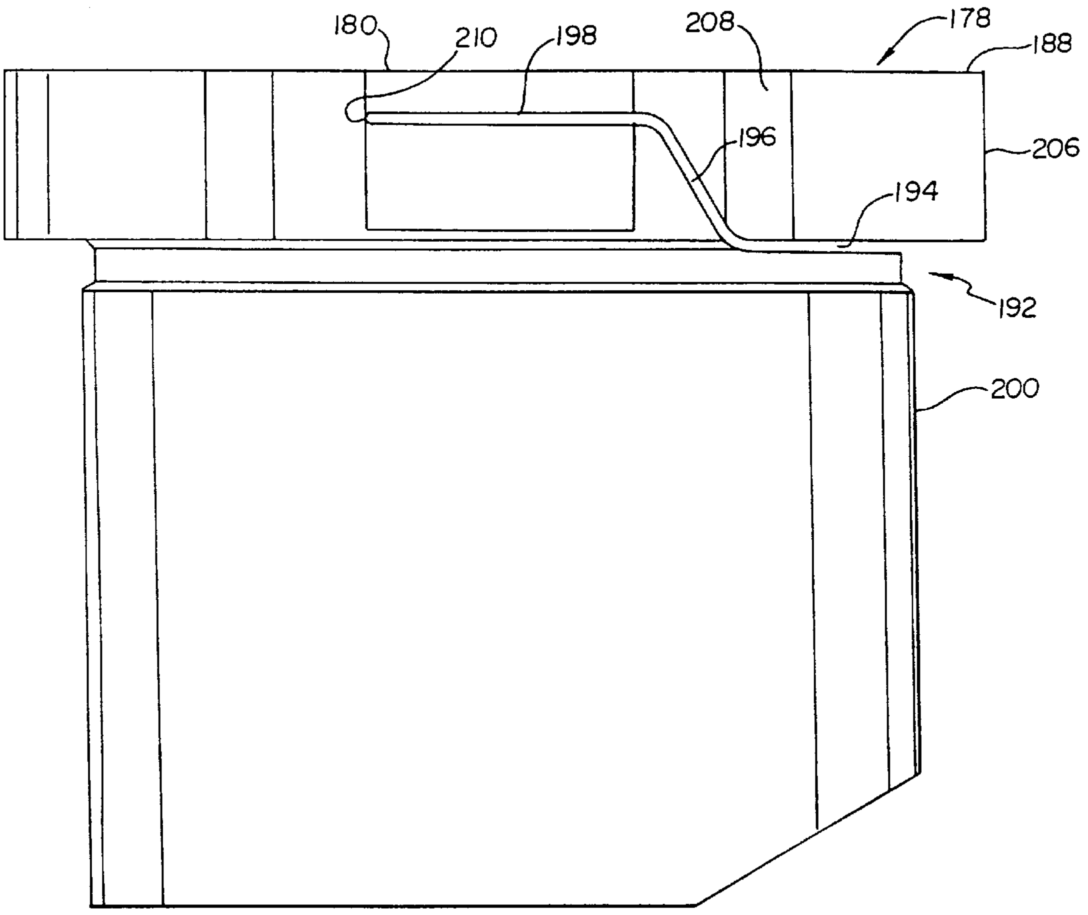
FIG. 15 is a fragmentary, side view of the body of FIG. 14.

Referring now to FIG. 15, body 178 is further illustrated, showing relief cut 192, including front portion 194, transition portion 196, and side portion 198. In the embodiment illustrated, relief cut 192 is formed directly under the front portion of lip 206, leaving a thick portion of lip 206 in front. Relief cut 192 continues towards the side, entering transition region 196, angling upward toward top surface 180, and continuing in side portion 198. Relief cut 192, as illustrated, forms a cantilevered arm 208 attached at 210, thus forming a flexible member or spring.

The embodiments of FIGS. 13–15 can be further explained with reference to other embodiments illustrated in FIGS. 1 and 9. As the tension bolt is tightened and the insert drawn downward and forward, the contact face will apply downward and forward force to the workpiece. This force will be opposed by an opposite force of the workpiece on the contact face, acting to rotate the insert and body away from the workpiece. While this may be controlled in part by tight tolerances on the fit between insert and body, and body and fixture block surface cavity, some wobble or movement of the contact face away from the workpiece may still occur. This can result in loss of grip or friction due to a reduction in engagement between the workpiece and the contact face.

As can be seen from inspection of another embodiment having a body lip illustrated in FIG. 12, when the insert is inserted into the body, the workpiece may come to rest directly on the top front portion of the lip. The workpiece may thus apply direct downward force to the lip and body as well.

Referring again to FIG. 13, insert contact portion 171 and contact face 170 are cantilevered from insert cylindrical portion 161, separated by relief cut 172. Cantilevered contact face 170 is made resilient by relief cut 172, and can accommodate some of the tilting caused by force applied to contact face 170 by the workpiece. The force that is accommodated is force that could otherwise act to rotate the insert contact face away from the workpiece. Referring again to FIGS. 13–15, cantilever arm 208 can absorb force applied directly on lip top portion 188 or indirectly, from workpiece force transmitted through contact face 170, through insert 160, through insert ledge 173, and to body front recessed land 190. As can be seen from inspection of FIGS. 14 and 15, force applied to body top front portion 188, either directly or indirectly, can be resiliently accommodated by the cantilevered arm formed by relief cut 192.

The relief cuts can thus impart resiliency to both body and insert, and compensate for the tendency of the workpiece to rotate the body, insert, and contact face away from the workpiece. This added resiliency thus counteracts less than perfect tolerances in machining the insert, body, and fixture block hole to receive the body. The relief cuts allow the contact face to maintain maximum surface area in contact with the workpiece. Further, the body relief cut compensates for any lift by body rotation so that the bottom of the workpiece is maintained parallel with the work surface and does not lift. The added resiliency can provide more reproducible workpiece positioning and less variation in the finished workpieces, including the vertical or Z-axis.

For machining metals, such as milling and drilling, the body and insert are preferably made of metal, most preferably stainless steel. For wood working, one embodiment utilizes a body and insert formed of plastic, preferably a rigid, engineered plastic. In yet another embodiment, body and insert are made from wood, preferably a hard wood.

In use, the workpiece or part to be worked upon is disposed against a lip or face on the fixture block or work table. The clamp body is then set near the workpiece, with the insert at least partially retracted from the body. The body is secured, directly or indirectly, to the work table. The body can be secured by dropping the body into a surface cavity designed to receive the body. The body can also be secured by inserting the body into a channel or track in the fixture block or work table. The body can be further secured by bolting the body to the block or table. In a preferred embodiment, a fixture block is provided and adapted to be used with a clamp and a workpiece of a certain size. The fixture block can, in turn, be secured to the work table using methods well known to those skilled in the art. The use of fixture blocks allows use of custom fixture blocks with standard work tables.

Numerous characteristics and advantages of the invention covered by this document have been set forth in the foregoing description. It will be understood, however, that this disclosure is, in many respects, only illustrative. Changes may be made in details without exceeding the scope of the invention. The invention's scope is, of course, defined in the language in which the appended claims are expressed.

What is claimed is:

1. A clamp for holding a workpiece to a work surface comprising:

a body including an angled recess;

means for mounting said body to said work fixture;

an insert adapted to be slidably received within said angled recess;

means for drawing said insert into said body recess; and a workpiece contact face operably positioned on said insert, such that securing said body to said work fixture, placing said workpiece near said contact face, and drawing said insert into said angled recess applies force through said workpiece contact face against said workpiece, wherein said clamp includes means for imparting resiliency to said clamp, wherein said means for imparting resiliency acts to accommodate force between said workpiece and said clamp.

2. A clamp for holding a workpiece to a work surface comprising:

a body including an angled recess;

means for mounting said body to said work fixture;

an insert adapted to be slidably received within said angled recess;

means for drawing said insert into said body recess; and a workpiece contact face operably positioned on said insert, such that securing said body to said work fixture, placing said workpiece near said contact face, and drawing said insert into said angled recess applies force through said workpiece contact face against said workpiece, wherein said clamp includes means for imparting resiliency to said clamp, wherein said means for imparting resiliency acts to absorb force between said workpiece and said clamp, wherein said means for imparting resiliency is disposed within said body.

3. A clamp as recited in claim 1, wherein said means for imparting resiliency is disposed within said insert.

4. A clamp as recited in claim 2, wherein said means for imparting resiliency is also disposed within said insert.

5. A clamp as recited in claim 1, wherein said means for drawing said insert into said body recess includes a tension bolt, and further includes means for retaining said tension bolt within said insert, said retaining means secured to said insert and allowing rotation of said tension bolt against said retaining means, such that rotating said bolt in a first direction against said retaining means applies force against said retaining means and operates to withdraw said insert from said body recess and operates to reduce said contact face applied force.

6. A clamp for holding a workpiece to a work fixture having a work surface, comprising:

a body including a top, a bottom, a recess formed into said body top, said recess defined at least in part by a forward wall and a rearward wall, said recess being angled relative to said work surface; and an insert sized to be slidably received within said body recess, including means for drawing said insert into said body recess, wherein said insert includes a contact face for engaging a workpiece, wherein in use, said insert is supported by contact with said rearward wall of said recess as such contact face engages said workpiece with increasing force, said rearward wall providing substantial surface area for such contact to minimize deflection of said contact face as clamping force is increased, wherein said clamp includes at least one relief cut therein for resiliently accommodating force applied to said body.

7. A clamp for holding a workpiece to a work fixture having a work surface, comprising:

a body including a top, a bottom, a recess formed into said body top, said recess defined at least in part by a forward wall and a rearward wall, said recess being angled relative to said work surface; and an insert sized to be slidably received within said body recess, including means for drawing said insert into said body recess, wherein said insert includes a contact face for engaging a workpiece, wherein in use, said insert is supported by contact with said rearward wall of said recess as such contact face engages said workpiece with increasing force, said rearward wall providing substantial surface area for such contact to minimize deflection of said contact face as clamping force is increased, wherein said clamp includes at least one relief cut therein for resiliently opposing force applied to said body, wherein said body includes a relief cut therein for resiliently opposing force applied to said body.

8. A clamp as recited in claim 7, wherein said relief cut is disposed at least in part in said forward wall.

9. A clamp as recited in claim 8, wherein said body top defines a top plane and at least part of said relief cut is substantially co-planar with said top plane.

10. A clamp as recited in claim 6, wherein said insert includes a relief cut therein for resiliently accommodating force applied to said insert.

11. A clamp as recited in claim 10, wherein said relief cut is disposed at least in part proximate said contact face.

12. A clamp as recited in claim 1, wherein said insert has a top surface and said relief cut is substantially perpendicular to said top surface.

13. A clamp for holding a workpiece to a work surface comprising:

a body, said body having a substantial portion thereof sized for being slidably disposed within a round bore forming a recess into said work surface;

a moveable workpiece contact face operably joined to said body for movement relative thereto, said moveable workpiece contact face having at least a portion thereof extending above said work surface; and a relief cut disposed proximate said contact face for resiliently accommodating force applied to said contact face.

* * * * *

UNITED STATES PATENT AND TRADEMARK OFFICE

CERTIFICATE OF CORRECTION

PATENT NO. : 6,202,996 B1 Page 1 of 1

DATED : March 20, 2001

INVENTOR(S) : Cutsforth et al.

It is certified that error appears in the above-identified patent and that said Letters Patent is hereby corrected as shown below:

Column 12,

Line 51, delete "in claim 1", and insert -- in claim 11 --.

Signed and Sealed this

Twenty-fifth Day of June, 2002

Attest:

JAMES E. ROGAN

*Attesting Officer* *Director of the United States Patent and Trademark Office*